(12) United States Patent
Agarwal et al.

(10) Patent No.: US 9,674,297 B2
(45) Date of Patent: Jun. 6, 2017

(54) HANDLING PACKET REORDERING AT A NETWORK ADAPTER

(71) Applicant: International Business Machines Corporation, Armonk, NY (US)

(72) Inventors: Kanak B. Agarwal, Austin, TX (US); Wesley M. Felter, Austin, TX (US); Keqiang He, Madison, WI (US); Eric J. Rozner, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 124 days.

(21) Appl. No.: 14/617,017

(22) Filed: Feb. 9, 2015

(65) Prior Publication Data

US 2016/0234127 A1    Aug. 11, 2016

(51) Int. Cl.
*H04L 12/56* (2006.01)
*H04L 29/08* (2006.01)
*H04L 12/801* (2013.01)
*H04L 12/707* (2013.01)

(52) U.S. Cl.
CPC .......... *H04L 67/2852* (2013.01); *H04L 47/34* (2013.01); *H04L 45/24* (2013.01)

(58) Field of Classification Search
CPC . H04L 47/624; H04L 69/324; H04L 67/2852; H04L 12/863
USPC ........................................................ 370/394
See application file for complete search history.

(56) References Cited

U.S. PATENT DOCUMENTS

| | | | |
|---|---|---|---|
| 2005/0058145 A1* | 3/2005 | Florencio ............. | G10L 19/005 370/412 |
| 2010/0138919 A1* | 6/2010 | Peng ................. | H04L 29/12009 726/22 |
| 2012/0147869 A1* | 6/2012 | Chhatriwala ....... | H04W 28/065 370/338 |
| 2013/0132604 A1 | 5/2013 | Cohen et al. | |
| 2013/0205037 A1 | 8/2013 | Biswas | |
| 2015/0016294 A1* | 1/2015 | Hegge .................... | H04L 47/41 370/252 |
| 2015/0110407 A1* | 4/2015 | Sinha ................... | G06K 9/6267 382/225 |

* cited by examiner

*Primary Examiner* — Sai-Ming Chan
(74) *Attorney, Agent, or Firm* — Garg Law Firm, PLLC; Rakesh Garg; Mercedes L. Hobson

(57) ABSTRACT

A network adapter for handling packet reordering receives a set of packets. The network adapter is configured to aggregate a subset of in-sequence packets from the set of packets into at least one segment before passing the at least one segment from the network adapter to a next layer in a protocol stack. An in-sequence packet from the set of packets is stored into a first segment. Responsive to receiving an out of sequence packet in the set of packets, the out of sequence packet is stored in a second segment. An adaptive timeout timer is activated responsive to receiving the out of sequence packet, and the first segment is held at the network adapter while the adaptive timeout timer runs. Prior to the adaptive timeout timer expiring, a missing packet is received and included in the first segment. The network adapter sends the first segment to the next layer.

25 Claims, 9 Drawing Sheets

800

US 9,674,297 B2

HANDLING PACKET REORDERING AT A NETWORK ADAPTER

TECHNICAL FIELD

The present invention relates generally to a method, system, and computer program product for managing received data packets in a receiving data processing system in a data network. More particularly, the present invention relates to a method, system, and computer program product for handling packet reordering at a network adapter.

BACKGROUND

A data network facilitates data transfers between two or more data processing systems. For example, an application executing in one data processing system acts as the sender of the data, and another application executing in another data processing system acts as the receiver of the data. Between the sender system (also referred to herein as "host" or "sender node") and the receiver system (also referred to herein as "receiver node"), the data follows a data path that comprises one or more links between networking components, such as routers and switches.

Within a data processing system, such as in the sender system, the sender application typically hands-off the data to some functionality in the system that manages the data flows in and out of the system.

For example, in a Transmission Control Protocol (TCP) implementation, a sender application hands off the data to a Transmission Control Protocol (TCP) stack. Within the layers of the protocol stack, the data is broken down into segments of data. The segments of data eventually are further broken down into data packets, and the data packets leave the sender system via a physical Ethernet adapter configured in the system.

A physical Ethernet adapter is a type of a physical network adapter device, also known as a network interface card (NIC), which comprises hardware components such as a memory device, firmware components such as code persistently loaded in one such memory device, software components such as a device driver and software components called or used by the device driver executing to facilitate the operations of the adapter within a given operating system. Hereinafter, a reference to an "adapter, a "card", or a "NIC" refers to the combination of the hardware, firmware, and software of a network interface card configured for data communications using packetized data according to any suitable data communication protocol, including but not limited to TCP.

Once the data packets leave the sender system, the data packets travel on one or more data communication links to one or more networking components, and eventually reach the receiver system. Particularly, the data packets are received by a NIC in the receiver system. The NIC reassembles the data packets into segments and pushes the segments up to a protocol stack. Eventually, a receiver application in the receiver system receives the data that has been reconstructed from the received segments.

In a data processing environment, such as in a datacenter, many data processing systems are connected via a data network. At any given time, several systems may be transmitting data of various sizes to several other systems. Many of these data transmissions can utilize a common link in the network, to get their packets from their respective sender systems to their respective receiver systems.

A data communication link in a network can become congested when more than a threshold amount of data traffic tries to use the link during a given period. The data traffic of some data flows (hereinafter, "flow", or "flows") appears in bursts, causing the data traffic on a link to spike. A link can also be over-subscribed, i.e., too many flows may try to use the link at a given time. Flow collisions, packet loss, network latency, and timeouts are some examples of problems that are caused when the utilization of a link exceeds a threshold.

Some flows in a network are small flows and some are large flows. A flow that transmits less than a threshold amount of data in a given period is a small flow. A flow that transmits the threshold amount of data or more in a given period is a large flow.

The data packets of the various flows wanting to use a link are queued. For using a link, small flow packets that are queued after the packets of a large flow will have to wait significantly longer to use the link, as compared to when the small flow packets are queued after the packets of another small flow. Typically, over a period of operation in a data network, small flows outnumber large flows but data transmitted by large flows exceeds the data transmitted by small flows. Thus, the use of communication links in a network by a mix of large and small flows often results in unacceptable performance of applications and operations related to the small flows, because of the large flows.

Furthermore, the data packets of a particular flow can travel on different links. Different links can have different latencies and congestion levels. Accordingly, different packets of the same flow can start from a sender system in sequence, but arrive at the receiver system out of sequence. Some data packets can be lost in the data network for a variety of reasons. A lost data packet either never reaches the receiver system, or does not reach the receiver system in a timely manner.

SUMMARY

The illustrative embodiments provide a method, system, and computer program product for handling packet reordering at a network adapter. An embodiment includes a method for handling packet reordering at a network adapter. The embodiment receives a set of packets at a network adapter, wherein a component of the network adapter is configured to aggregate a subset of in-sequence packets from the set of packets into at least one segment before passing the at least one segment from the network adapter to a next layer in a protocol stack. The embodiment stores an in-sequence packet from the set of packets into a first segment. The embodiment stores, responsive to receiving an out of sequence packet in the set of packets, the out of sequence packet in a second segment. The embodiment activates, responsive to receiving the out of sequence packet, an adaptive timeout timer. The embodiment holds the first segment at the network adapter while the adaptive timeout timer runs. The embodiment receives, prior to the adaptive timeout timer expiring, a missing packet. The embodiment includes the missing packet in the first segment. The embodiment sends the first segment to the next layer.

Another embodiment further determines whether to activate the adaptive timeout timer, wherein the activating is responsive to determining that the adaptive timeout timer should be activated.

Another embodiment further determines whether the out of sequence packet is one of (i) a beginning packet, and (ii) an ending packet, of a data flow chunk identified by a chunk identifier, wherein the activating is further responsive to the out of sequence packet being one of the beginning packet and the ending packet of the data flow chunk.

In another embodiment, the chunk identifier is distinct from a data flow identifier associated with the data flow.

Another embodiment further determines that a packet in the set of data packets is out of sequence. The embodiment determines that the packet is not one of a beginning packet and an ending packet of a data flow chunk identified by a chunk identifier. The embodiment omits activating a second adaptive timeout timer for the packet. The embodiment regards the packet as lost.

Another embodiment further configures the adaptive timeout timer for measuring a period, wherein the gap time comprises an amount of time a reordered packet of a previous segment takes to arrive.

Another embodiment further measures a set of gap times, wherein the gap time is a member of the set of gap times. The embodiment applies, as a part of determining the period, a function to the set of gap times.

Another embodiment further determines a span of a second gap time in the set of gap times, wherein the span identifies a number of intervening packets received during the second gap time; and computing an average of the set of gap times, wherein the function uses the span and the average.

Another embodiment further computes, as a part of computing the average, an Exponentially weighted Moving Average (EWMA) of the set of gap times.

In another embodiment, the common aspect comprises a data flow, where the segment and the second segment are each parts of the data flow.

In another embodiment, the common aspect comprises a data flow chunk identifier, and wherein the segment and the second segment are each parts of the data flow such that packets in the segment and packets in the second segment each carry the chunk identifier.

Another embodiment further receives the out of sequence packet at the network adapter, wherein the out of sequence packet comprises a packet sequence identifier. The embodiment determines, by comparing the packet sequence identifier with another packet sequence identifier associated with an in-sequence packet received prior to the out of sequence packet, that a packet sequence identifier corresponding to the missing packet is missing, wherein the missing packet should have been received after the in-sequence packet and before the out of sequence packet.

In another embodiment, the component of the network adapter comprises a hardware component in the network adapter.

In another embodiment, the component of the network adapter comprises a device driver of the network adapter.

In another embodiment, the component of the network adapter comprises a firmware component in the network adapter.

In another embodiment, the component of the network adapter comprises a code called by a device driver of the network adapter.

Another embodiment further, after receiving a missing packet, merges the second segment into the first segment when the first and second segments are in sequence and the merging does not cause the first segment to exceed a segment size threshold.

Another embodiment includes a computer usable program product for handling packet reordering at a network adapter.

Another embodiment includes a data processing system for handling packet reordering at a network adapter.

Another embodiment includes a network adapter for handling packet reordering.

Another embodiment includes a system for handling packet reordering.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
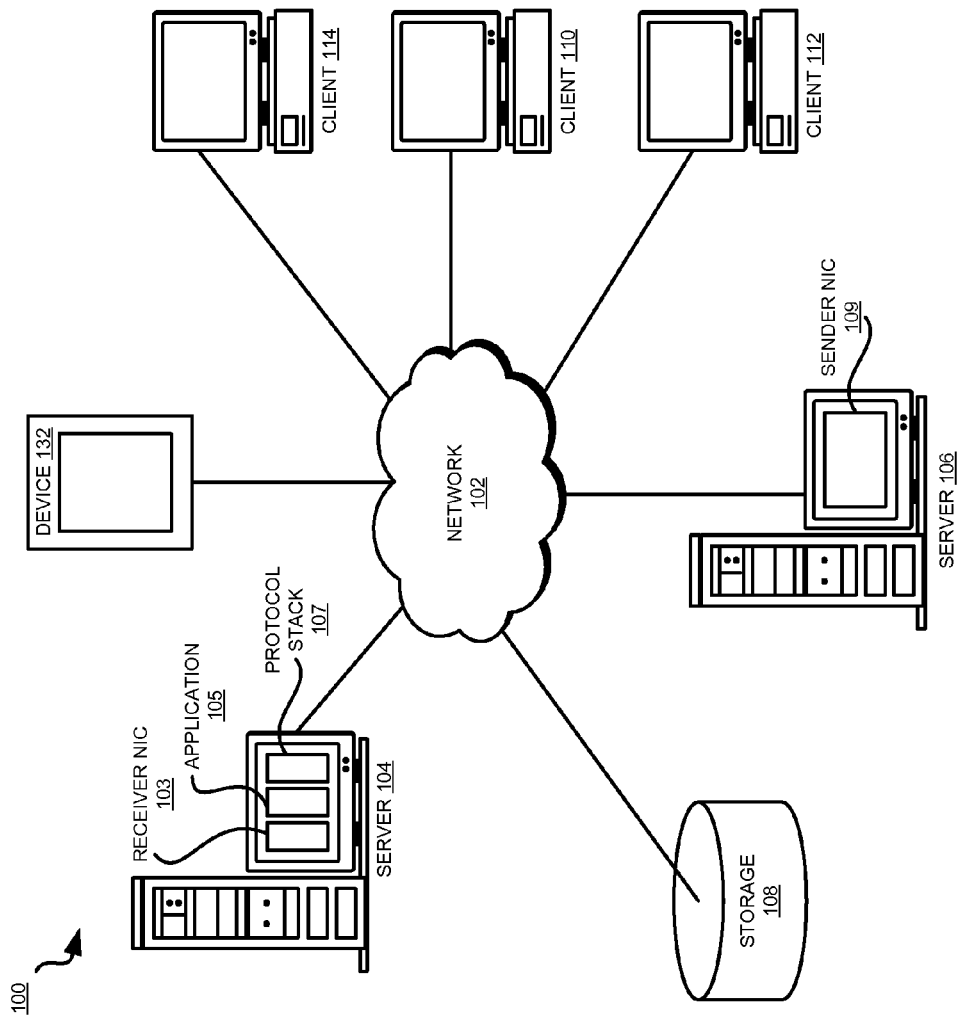
FIG. 1 depicts a block diagram of a network of data processing systems in which illustrative embodiments may be implemented.

Changing the order or sequence of data packets from an original sequence in which the data packets are transmitted from a sender system to a changed sequence in which the data packets are received at a receiver system is called reordering of data packets, or packet reordering. Packet reordering also includes changing the sequence of the data packets by dropping, losing, or otherwise omitting a packet from the sequence.

For example, suppose that a sender system sends packets P0, P1, and P2 of a particular flow in that sequence. A receiver system receives reordered packets if the receiver system receives packets P1, P0, and P2, in that order. In this reordered sequence, P0 is an out of order or out of sequence packet. The receiver system also receives reordered packets if the receiver system receives packets P0 and P2 without timely receiving packet P1. In this reordered sequence, P2 is an out of sequence packet.

Now suppose that sender system A is sending packets P0, P1, and P2 from one segment of flow F1 packets P5, P6, and P7 from another segment of flow F1. A receiver system receives reordered packets if the receiver system receives packets P0, P1, P5, and P2, in that order. In this reordered sequence, P5 is an out of sequence packet. The receiver system also receives reordered packets if the receiver system receives packets P5, P6, P2, and P7. In this reordered sequence, P2 is an out of sequence packet.

The data packets arrive at a receiver system on a data communication link arrive into a NIC configured in the receiver system. The NIC hardware optionally performs checksum verification and the NIC device driver performs packet capture operation.

The NIC reconstructs the segments of data from the arriving data packets. A network layer is higher up in the protocol stack from the layer in which the NIC operates. The NIC hands off the segments to the network layer. The network layer hands of the received data of the segments to a transport layer, which is higher than the network layer in the protocol stack. The transport layer hands off the data to the next higher layer—the application layer.

Different mechanisms to reconstruct a segment from the received data packets are presently available in NIC hardware or NIC software. For example, when segment reconstruction is implemented in NIC hardware, the hardware uses a hardware configuration called Large Receive Offload (LRO) to construct the segments. When segment reconstruction is implemented in NIC software, the NIC device driver calls a Generic Receive Offload (GRO) code to construct the segments.

Packet reordering is a common problem in data networks. Various applications handle the packet reordering problem in a variety of ways. For example, in some implementations, the application layer employs a buffering and sorting mechanism to handle reordered packets. In other implementations, the transport layer, such as TCP, implement the buffering and sorting mechanism.

The illustrative embodiments recognize that handling reordered packets at a NIC poses a far more complicated and critical problem than handling reordered packets at higher layers in a protocol stack later. For example, higher-layer buffers are typically state-aware. The presently-used algorithms in the NIC are designed to be fast, so they are stateless. Implementing a higher-layer solution in the NIC under the presently used NIC algorithms would be inefficient and slow, which can lead to packet loss, retransmissions, extra delay, and other such undesirable effects.

The illustrative embodiments recognize that any process to manage packet reordering in a NIC hardware, in NIC software, or in a software component called or used by NIC software has to be fast, lightweight, and judicious in how to manage reordered packets. Most higher layer solutions to handle packet reordering store and inspect the data to such an extent that would make the solution too slow, too heavy weight, or both if implemented in a NIC.

The illustrative embodiments used to describe the invention generally address and solve the above-described problems and other problems related to managing reordered packets at a NIC. The illustrative embodiments provide a method, system, and computer program product for handling packet reordering at a network adapter.

A load-balancing technique balances the data traffic across communication links in a data network by creating a set of fragments of data from a flow. Each fragment is called a chunk and comprises a set of data packets from the flow. Each chunk has a chunk size and a chunk identifier (chunk ID) that is distinct from an identifier associated with the flow. In other words, the total size of data in all the data packets of the chunk does not exceed the chunk size, and each data packet in the chunk contains the chunk ID.

Within the scope of the illustrative embodiments, an embodiment can be implemented in hardware in the hardware of a NIC, e.g. in the LRO or an equivalent thereof; in code in a firmware of the NIC; in software e.g., in a device driver of the NIC or an equivalent thereof; or in software in a software component called or used by the NIC, e.g., in the GRO or an equivalent thereof.

Presently, a NIC starts to build a segment as soon as it receives the first packet in the segment. The NIC continues to build the segment by merging the arriving in-sequence packets into the segment. If a pre-determined segment size is reached by the merging, or if the NIC receives an out of sequence packet, the NIC ends building the segment and pushes the segment up to the next higher layer in the protocol stack.

If the NIC ends the segment building due to an out of sequence packet, the NIC begins constructing a new segment starting with the out of sequence packet and continues till either the segment size is reached by merging in-sequence, or if the NIC receives another out of sequence packet.

For example, suppose that packets P0, P1, and P2 are from flow F1 and take one path through the network, and packets P5, P6, and P7 are from flow F1, which for some reason took a different path in the network. A NIC in a receiver system receives reordered packets P0, P1, P5, P2, P6, and P7 in that order. The NIC starts creating segment S1 with packet P0, merges P1 with S1. Upon receiving P5, the NIC pushes up S1, and begins building new segment S2 with P5. Upon receiving P2, the NIC pushes up S2, and begins building new segment S3 with P2. Upon receiving P6, the NIC pushes up S3, and begins building new segment S4 with P6. The NIC merges P7 with S4 and pushes up S4.

As can be seen, the presently available method of handling reordered packets causes an undesirable number of partial segments to be created and pushed up the stack by the NIC. Receiving too many small data segments, such as the partial segments in the described example, at the higher networking layers imposes an undesirably high CPU overhead on the data processing system and can significantly limit the throughput of a network flow. The prior-art GRO/LRO techniques seek to mitigate this overhead to some extent. The illustrative embodiments recognize that the presently available GRO/LRO techniques are still not able to reduce the partial data segments to a desirable level. The illustrative embodiments provide a method by which data segments that are larger than the GRO/LRO segments can be pushed up to higher layers.

In contrast, for the same example case, assume that a NIC modified according to an embodiment described herein receives the same reordered packets P0, P1, P5, P2, P6, and P7 in that order. The modified NIC starts creating segment S1 with packet P0, merges P1 with S1. Upon receiving P5, the modified NIC starts an adaptive timeout timer for receiving P2, does not push up S1, and begins building new segment S2 with P5.

An adaptive timeout timer is a timer than measures an adaptive timeout. An adaptive timeout is a adaptive period during which a packet that is missing from a correct sequence of packets should be received to continue building a segment. The adaptive period is a period that adapts to the delays, latency, and other actual network conditions existing during a period in which the sequence of packets is being received. An embodiment adapts or changes the adaptive period, such as to increase or decrease the adaptive period, so that a modified NIC waits longer or shorter, respectively, for the missing packet before closing the segment without the missing packet.

According to one embodiment, after the adaptive period, the modified NIC considers the missing packet as lost. According to another embodiment, after the adaptive period, the modified NIC closes or stops building the segment in which the missing segment was expected, and merges the missing packet in another segment as and when the missing packet arrives. Merging missing packets in this manner, an embodiment satisfies the need under certain protocols, such as under TCP, that the segment should have contiguous data.

Continuing with the example, upon receiving P2 within the adaptive timeout period, the modified NIC merges P2 with S1, pushes up S1 if the segment size is reached, and starts another adaptive timeout timer for receiving P6. Upon receiving P6 within the adaptive timeout, the modified NIC merges P6 with S2 and terminates the adaptive timer. The modified NIC receives P7 in sequence, merges P7 with S2 and pushes up S2 if the segment size is reached.

As can be seen, the modified NIC forms fewer segments that are more complete than the segments constructed by the prior-art NIC without the benefit of an embodiment. Other embodiments when used in a modified NIC determine when the adaptive timeouts should be used, when a missing packet in reordered packets is to be regarded as lost, when a segment construction should be ended, how the adaptive timer may be adjusted, and combinations of these and other functions described herein.

A method of an embodiment described herein, when implemented to execute on a device or data processing system, comprises substantial advancement of the functionality of that device or data processing system in managing reordered data packets. For example, in order to manage reordered packets, a prior-art NIC creates a partial segment each time an out of sequence packet is encountered in the inflow of packets. In contrast, a NIC that has been modified with an embodiment sets an adaptive timeout for the missing packet that caused a packet to be out of sequence in an attempt to allow the missing packet additional time and to complete a segment by merging the missing packet with the segment if the missing packet arrives within the adaptive timeout. Such manner of handling packet reordering at a network adapter is unavailable in presently available devices or data processing systems. Thus, a substantial advancement of such devices or data processing systems by executing a method of an embodiment facilitates the management of reordered packets without causing undesirable latency in the network, undesirable delays in making the data available to the higher layers of a protocol stack, or both.

The illustrative embodiments are described with respect to certain flows, protocols, sizes, thresholds, timeouts, networking components, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
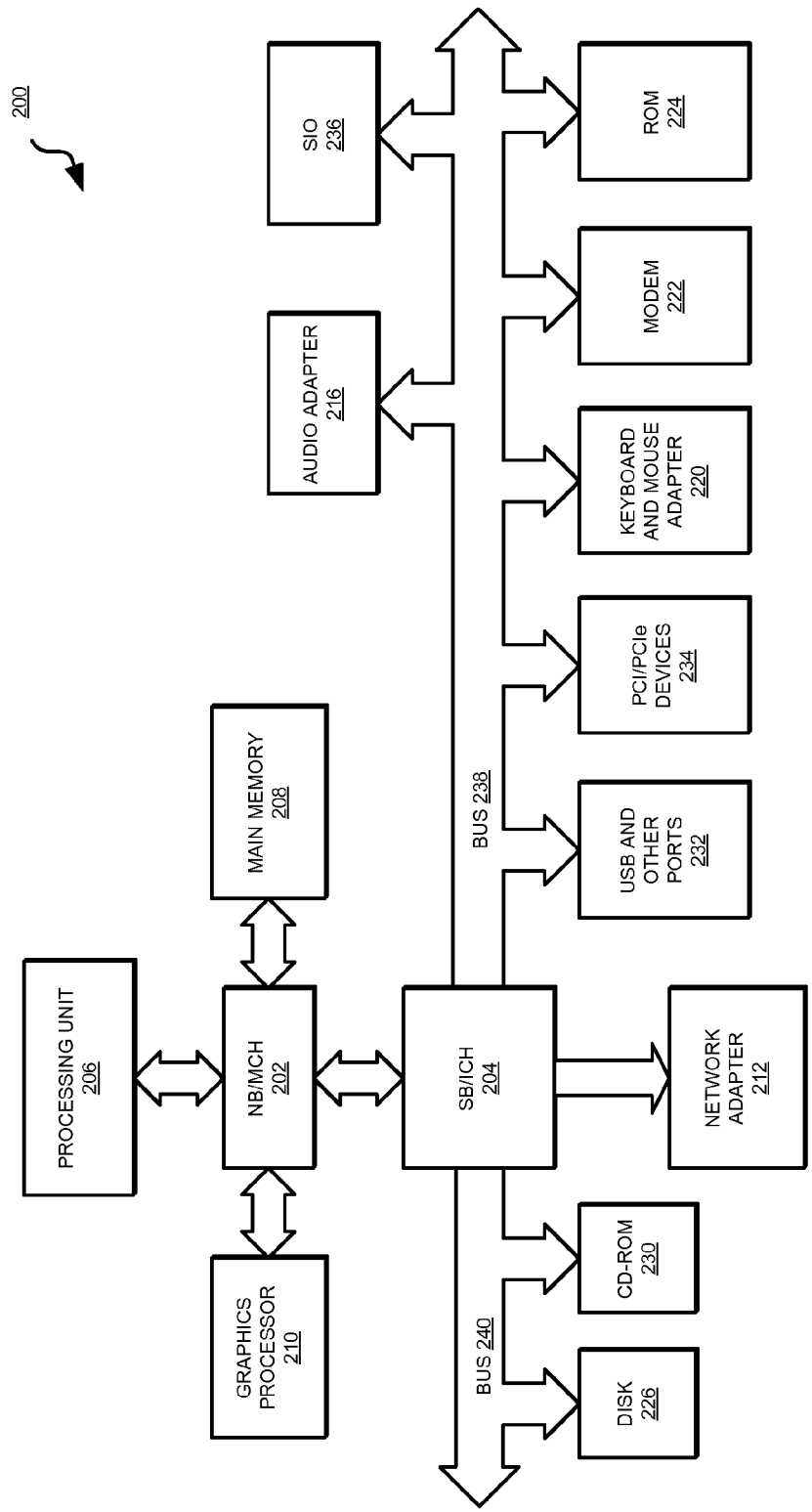
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner. Server 106 operates as a sender system and has NIC 109 operating therein and sending data packets over network 102. Receiver NIC 103 operates is server 104, and operates in conjunction with application 105. Application 105 implements an embodiment described herein. NIC 103 is modified by either implementing application 105 in the hardware of NIC 103; implementing application in a firmware of NIC 103; implementing application 105 in a device driver of NIC 103; implementing application 105 in a software called or used by the hardware, firmware, or device driver of NIC 103; or some combination thereof. NIC 103, using application 105, receives data packets, including out of sequence data packets, from sender NIC 109. NIC 103, using application 105, constructs segments from the received data packets and pushes the segments to a layer above the NIC in protocol stack 107, such as to a network layer or higher in stack 107.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a mobile computing device, which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
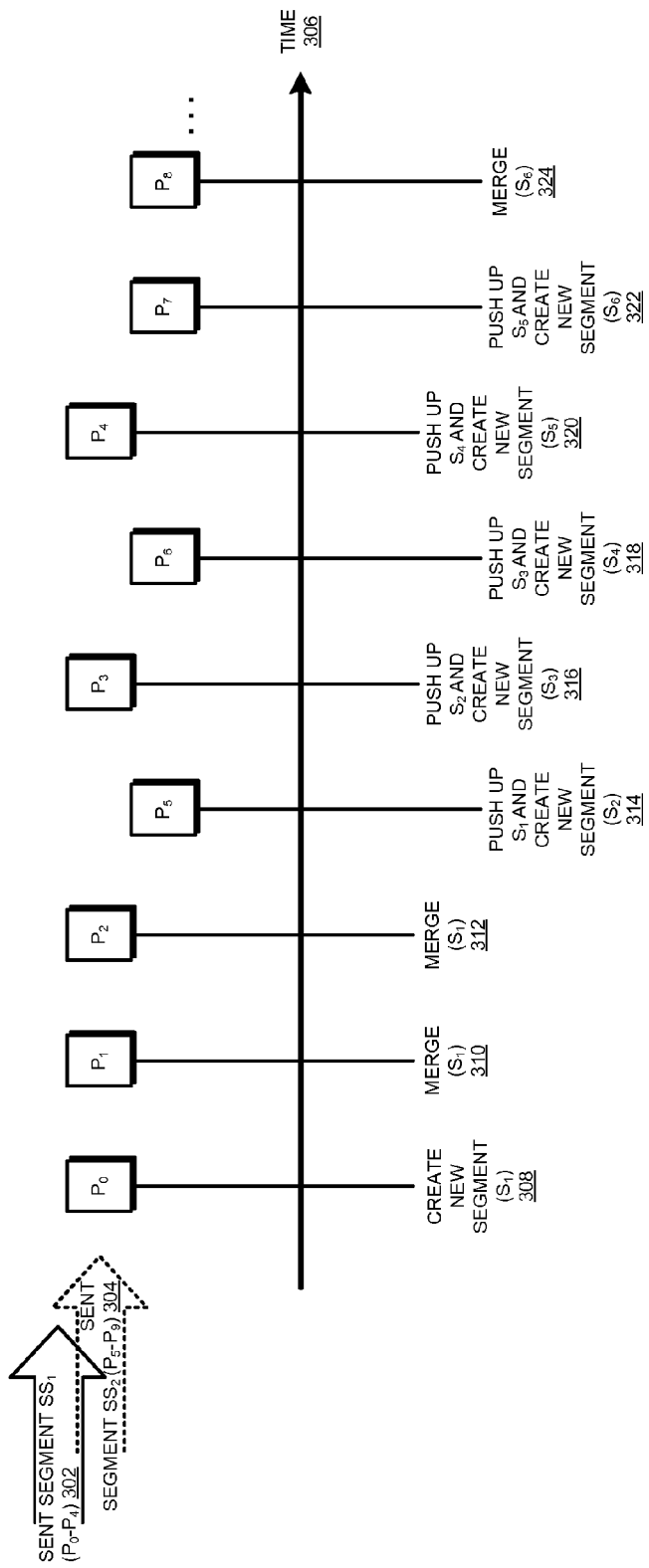
FIG. 3 depicts a timing diagram of a process of managing reordered packets that can be improved by using an illustrative embodiment.

With reference to FIG. 3, this figure depicts a timing diagram of a process of managing reordered packets that can be improved by using an illustrative embodiment. Sender NIC 109 in FIG. 1 sends example sent segment 302, labeled SS1, for example on behalf of a sender application executing in server 106 in FIG. 1. Sent segment SS1 is sent to a receiver NIC operating without the benefit of an embodiment, and comprises packets P0, P1, P2, P3, and P4, in that order.

Sender NIC 109 in FIG. 1 may send another sent segment 304 from the same flow. Accordingly, sent segment 304, labeled SS2, is sent to the same prior-art receiver NIC. Sent segment SS2 comprises packets P5, P6, P7, P8, and P9, in that order.

The receiver NIC receives the packets from sent segments SS1 and SS2 along timeline 306 in the order shown. According to the depiction, the receiver NIC receives packet P0, and begins creating a new segment S1 with packet P0 (308). The receiver NIC receives packet P1, finds packet P1 to be in-sequence after packet P0, and merges P1 with segment S1 (310). The receiver NIC receives packet P2, finds packet P2 to be in-sequence after packet P1, and merges P2 with segment S1 (312).

Thereafter, the receiver NIC receives packet P5 when packet P3 was expected, causing packet P5 to be out of sequence, and packet P3 to be missing. The receiver NIC stops building segment S1, pushes segment S1 up the stack, begins building a new segment S2, and merges P5 with segment S2 (314).

Thereafter, the receiver NIC receives packet P3 when packet P6 was expected, causing packet P3 to be out of sequence, and packet P6 to be missing. The receiver NIC stops building segment S2, pushes segment S2 up the stack, begins building a new segment S3, and merges P3 with segment S3 (316).

Thereafter, the receiver NIC receives packet P6 when packet P4 was expected, causing packet P6 to be out of sequence, and packet P4 to be missing. The receiver NIC stops building segment S3, pushes segment S3 up the stack, begins building a new segment S4, and merges P6 with segment S4 (318).

Thereafter, the receiver NIC receives packet P4 when packet P7 was expected, causing packet P4 to be out of sequence, and packet P7 to be missing. The receiver NIC stops building segment S4, pushes segment S4 up the stack, begins building a new segment S5, and merges P4 with segment S5 (320).

Thereafter, the receiver NIC receives packet P7 when packet P5 was expected, causing packet P7 to be out of sequence, and packet P5 to be missing. The receiver NIC stops building segment S5, pushes segment S5 up the stack, begins building a new segment S6, and merges P7 with segment S6 (322). The receiver NIC receives packet P8, finds packet P8 to be in-sequence after packet P7, and merges P8 with segment S6 (324). The receiver NIC continues operating in this manner for subsequent packets of SS1, SS2, and other sent segments.

Figure 4:
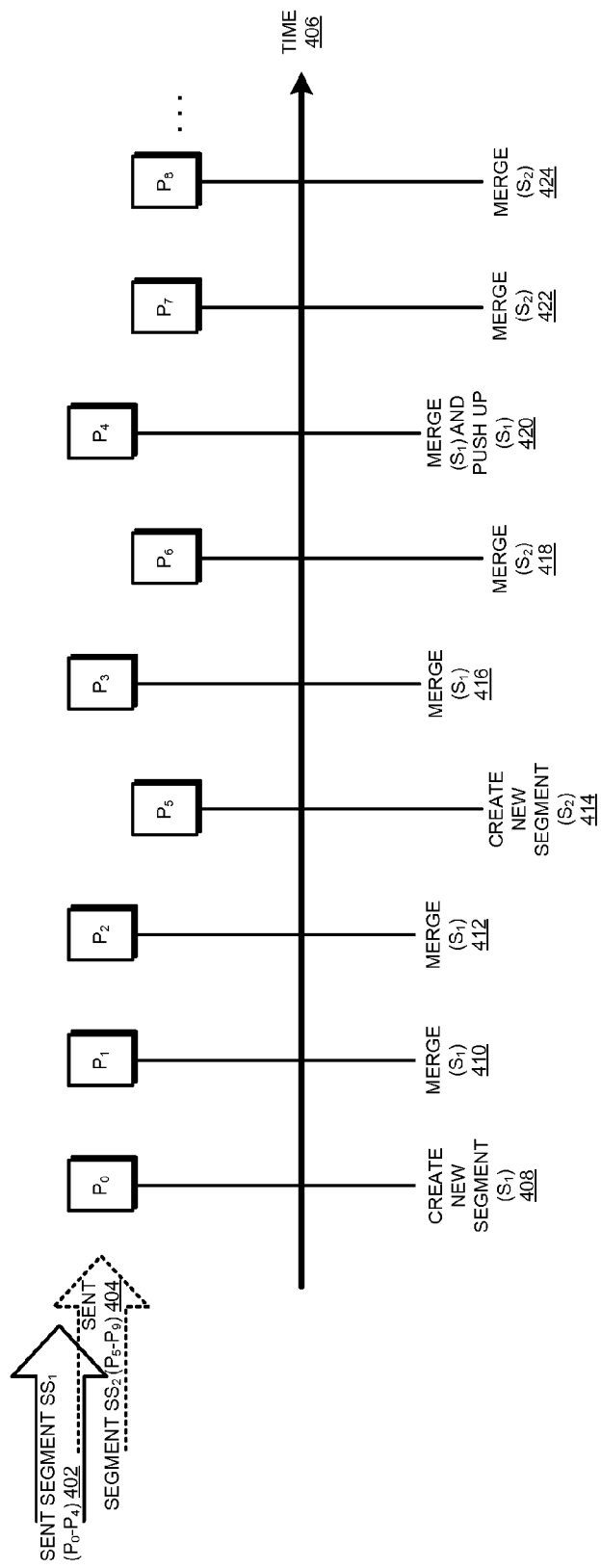
FIG. 4 depicts a timing diagram of a process of managing reordered packets in accordance with an illustrative embodiment.

With reference to FIG. 4, this figure depicts a timing diagram of a process of managing reordered packets in accordance with an illustrative embodiment. In a manner similar to sent segment SS1 302 in FIG. 3, sender NIC, such as sender NIC 109 in FIG. 1, sends example sent segment 402, labeled SS1, for example on behalf of a sender application executing in server 106 in FIG. 1. Sent segment SS1 is sent to a modified receiver NIC according to an embodiment, e.g., receiver NIC 103 operating in conjunction with application 105 in FIG. 1. Sent segment SS1 comprises packets P0, P1, P2, P3, and P4, in that order. Sent segment 404, labeled SS2, is sent to the modified NIC in a similar manner as sent segment 304 is sent to the prior-art receiver NIC in FIG. 3. Sent segment SS2 comprises packets P5, P6, P7, P8, and P9, in that order.

The modified receiver NIC receives the packets from sent segments SS1 and SS2 along timeline 406 in the order shown. According to the depiction, the modified receiver NIC receives packet P0, and begins creating a new segment S1 with packet P0 (408). The modified receiver NIC receives packet P1, finds packet P1 to be in-sequence after packet P0, and merges P1 with segment S1 (410). The modified receiver NIC receives packet P2, finds packet P2 to be in-sequence after packet P1, and merges P2 with segment S1 (412).

Thereafter, the modified receiver NIC receives packet P5 when packet P3 was expected, causing packet P5 to be out of sequence, and packet P3 to be missing. Without stopping the building of segment S1 and without pushing segment S1 up the stack, the modified receiver NIC begins building a new segment S2, and merges P5 with segment S2 (414).

The modified receiver NIC starts an adaptive timeout timer to wait for packet P3 for segment S1. The modified receiver NIC also starts to measure a time gap between the arrivals of packets P2 and P3.

For the clarity of the description, without implying any limitations on the illustrative embodiments, we will assume that in the example depiction of FIG. 4, the missing packets arrive before their respective adaptive timeout timers expire. An embodiment's handling of the segments when the missing packets do not arrive at the modified receiver NIC within the adaptive timeout is described elsewhere in this disclosure.

Thereafter, while the adaptive timeout timer for P3 has not expired, the modified receiver NIC receives packet P3. Without stopping the building of segment S2 and without pushing segment S2 up the stack, the modified receiver merges P3 with segment S1 (416). The modified receiver NIC starts another adaptive timeout timer to wait for packet P6 for segment S2. The modified receiver NIC also starts to measure a time gap between the arrivals of packets P5 and P6.

Thereafter, while the adaptive timeout timer for P6 has not expired, the modified receiver NIC receives packet P6. Without stopping the building of segment S1 and without pushing segment S1 up the stack, the modified receiver merges P6 with segment S2 (418). The modified receiver NIC starts another adaptive timeout timer to wait for packet P4 for segment S1. The modified receiver NIC also starts to measure a time gap between the arrivals of packets P3 and P4.

Thereafter, while the adaptive timeout timer for P4 has not expired, the modified receiver NIC receives packet P4. Without stopping the building of segment S2 and without pushing segment S2 up the stack, the modified receiver merges P4 with segment S1 (420). The modified receiver NIC starts another adaptive timeout timer to wait for packet P7 for segment S2. The modified receiver NIC also starts to measure a time gap between the arrivals of packets P6 and P7.

The segment size of segment S1 has now reached the preset or predetermined segment size, to wit, a segment size threshold. The gap in segment S1 due to the missing packet is now filled. The modified NIC stops building segment S1, and pushes segment S1 up the stack in step 420.

Thereafter, while the adaptive timeout timer for P7 has not expired, the modified receiver NIC receives packet P7. The modified receiver NIC merges P7 with segment S2 (422). The modified receiver NIC receives packet P8, finds packet P8 to be in-sequence after packet P7, and merges P8 with segment S2 (424). The modified receiver NIC continues operating in this manner for subsequent packets of SS1, SS2, and other sent segments.

Generally within the scope of the illustrative embodiments, when an out of sequence packet is received, and a missing packet is awaited, the out of sequence packet can be held in any suitable manner. For example, in one embodiment, the out of sequence packet is held in a buffer associated with a segment that is under construction. In another embodiment, the out of sequence packet is held in a buffer separate from a segment that is under construction. In another embodiment, a condition is evaluated to determine whether the out of sequence packet should be held in a buffer associated with a segment that is under construction, or separate therefrom.

Furthermore, in some cases, a segment size threshold might permit building large segments, for example, using packets P0-P8. In such cases, an embodiment holds P5 in a separate buffer when P5 arrives before the missing packets P3 and P4. Upon the arrival of P3 and P4, such an embodiment aggregates packets P3, P4, and P5 with packets P0, P1, and P2 in the segment under construction, and continue to build the segment with subsequent packets until the segment size threshold is reached. When the segment reaches the segment size threshold, such an embodiment pushes the segment up the stack to the next layer.

Figure 5:
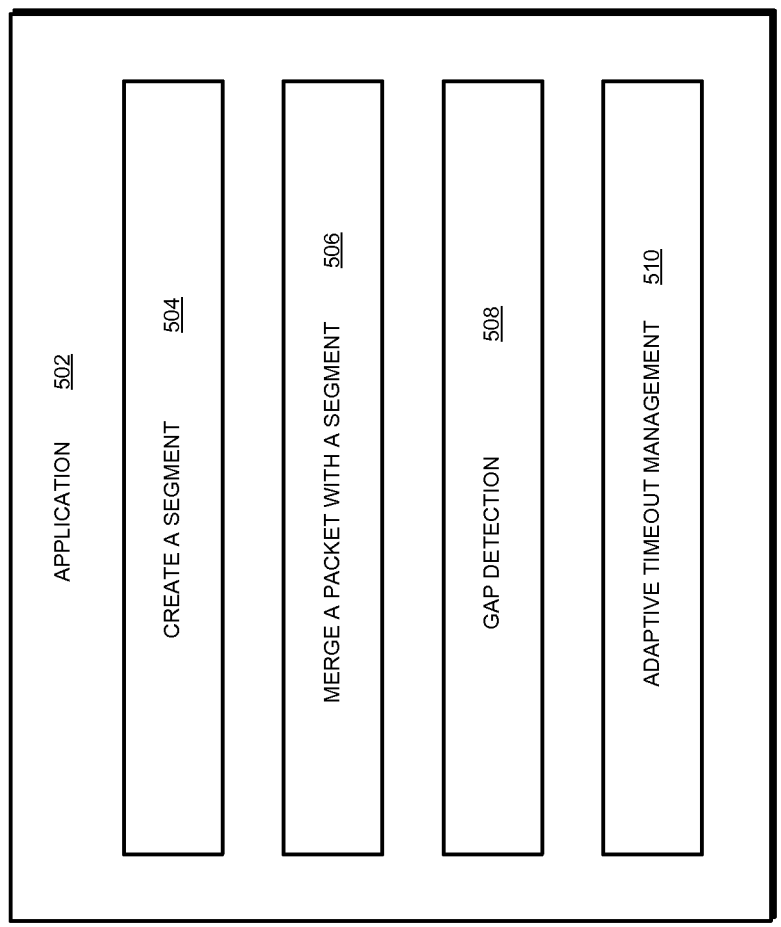
FIG. 5 depicts a block diagram of an application for handling packet reordering at a network adapter in accordance with an illustrative embodiment.

With reference to FIG. 5, this figure depicts a block diagram of an application for handling packet reordering at a network adapter in accordance with an illustrative embodiment. Application 502 is an example of application 105 in FIG. 1, and can be implemented in hardware, firmware, or software, as described elsewhere in this disclosure.

Component 504 creates a segment from the arriving packets. For example, component initiates the creation of a segment, stops building a segment, and pushes a segment up a stack in the manner described with respect to FIG. 4.

Component 506 merges a packet with a segment being built by component 504. For example, for a given packet, component 506 selects one segment from the possibly several segments under construction by component 504 at a given time, and merges the packet with the selected segment in the manner described with respect to FIG. 4.

Component 508 performs gap measurements between the arrival times of packets belonging to the same segment. Particularly, when a packet is missing in a sequence of packets that form a segment, component 508 initiates the measurement of the gap. Component 508 supplies the measured gap time information to component 510 for modifying the adaptive timeouts periods. Component 508 also supplies the measured gap time information to a repository that maintains a historical record of packet delays in the network.

Component 510 manages the adaptive timeouts. For example, component 510 initiates an adaptive timeout timer for a missing packet in a segment, stops the timer when the packet arrives within the adaptive timeout period, and produces an indication of the expiry of the adaptive timeout period when the corresponding missing packet fails to arrive within the adaptive timeout period.

Component 510 also adjusts the duration of the timeout in an adaptive timeout timer. Determining the length of time the receiver NIC should wait for a missing packet is a complex problem. This length of time should not be so long as to cause packet starvation in the higher layers or cause added delay in letting the transport or application layer to recover a loss. This length of time should not be so short so as to not give a missing packet a reasonable amount of time given the conditions in the link on which the packet is travelling, other conditions in the network, or a combination thereof.

If the length of time exceeds one threshold, the performance of an application that needs the data degrades below a certain level. If the length of time is below another threshold, a missing packet is regarded as lost even if the missing packet arrives at the modified receiver NIC in a reasonable time given a condition in the network, thereby causing unnecessary retransmissions of the missing packets in the network.

In one embodiment, component 510 starts with a default period set for an adaptive timeout timer. The default period can be user-supplied, system-configured, or set according to one or more entries of one or more packet delays in a historical record.

Thereafter, for various segments that traverse different links in the network, component 510 receives from component 508 the actual measured gap times for various missing or delayed packets. The measurements made by component 508 are indicative of the conditions existing in various parts of the network during a period in which the packets are currently being received.

For example, a network can have different topologies comprising networking components with differing characteristics in different parts of the network. As another example, a network can employ different load-balancing techniques in different parts of the network. As another example, a network can experience different traffic densities in different parts of the network. These and many other factors can result in different delays in packets traveling inside and outside those parts Using an actual measured gap time and one or more thresholds applicable to an adaptive timeout period, component 510 adjusts or adapts the adaptive timeout period. When component 510 uses a measured gap to increase an adaptive timeout period without exceeding a threshold, the modified receiver NIC waits longer for a missing packet on a link to which the measured gap relates. Conversely, when component 510 uses a measured gap to decrease an adaptive timeout period without falling below a threshold, the modified receiver NIC waits shorter for a missing packet on a link to which the measured gap relates.

The adaptive timeout periods managed by component 510 in this manner allow components 504 and 506 to operate such that a missing packet is received, a segment size threshold is reached, or the adaptive timeout period expires, before a segment is pushed up to a higher layer in the stack. This manner of operation of application 502 enables pushing up more complete segments than the prior-art, fewer missed packets being treated as lost, and fewer retransmissions of the delayed packets. Application 502 accomplishes these and other results without an undesirable loss of performance in the higher layers of a protocol stack, or undesirable impact on the performance of the network.

A prior-art receiver NIC operates in a stateless manner. In other words, the receiver NIC only keeps information about one segment at a time, only tracking the next expected sequence number and the size of the current segment that the receiver NIC is constructing. The receiver NIC does not keep any history or keep state on more than one segment at a time. In a stateless operation, the prior-art receiver NIC builds a segment with packets as the packets arrive, detects an out of sequence packet, and immediately pushes up the segment regardless of the state of the segment.

Operating in the manner described herein, application 502 allows a receiver NIC to operate in a stateful or state-based manner. In other words, the modified receiver NIC maintains state information of a segment—which packets should be expected for a segment, which of those packets have been received, which of those packets are awaited, whether the segment should wait for a pending packet in the segment, and the like. In a state-based operation, the modified receiver NIC builds a segment with packets as the packets arrive, detects an out of sequence packet, determines whether to wait for the missing packet, identifies a segment where the out of sequence packet belongs, and makes a decision on pushing up a segment depending upon a combination of whether the missing packet has been received, the segment size threshold has been reached, or an adaptive timeout has expired.

Figure 6:
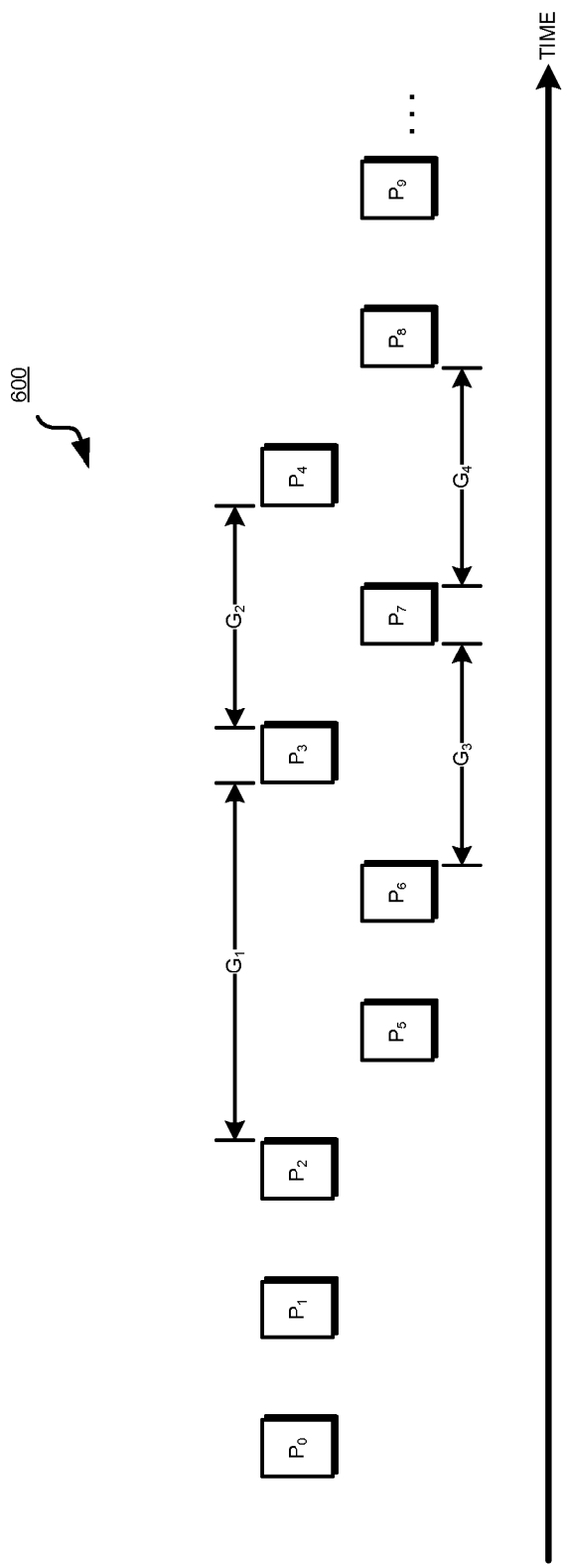
FIG. 6 depicts a timing diagram of a process of managing adaptive timeout periods in accordance with an illustrative embodiment.

With reference to FIG. 6, this figure depicts a timing diagram of a process of managing adaptive timeout periods in accordance with an illustrative embodiment. Process 600 can be implemented in application 502 in FIG. 5.

Assume, in the manner of FIG. 4 that the application is constructing a first segment from packets P0, P1, P2, P3, and P4, and a second segment using packets P5, P6, P7, P8, and P9. The application detects that packet P3 was delayed in the first segment because packets P5 and P6 of the second segment were received while waiting for packet P3. The application measures, e.g., using component 510 in FIG. 5, that the gap time or delay between packets P2 and P3 was G1. The application detects that packet P4 was also delayed because packet P7 of the second segment was received while waiting for P4, and that the gap time or delay between packets P3 and P4 was G2.

One embodiment measures gaps G1 and G2 assuming that no packets of the first segment are lost. Another embodiment measures gaps G1 and G2 assuming that the packets of the same segment do not intervene out of sequence, i.e., packet P2 does not arrive before packet P1, packet P4 does not arrive before packet P3, etc.

Similarly, for the second segment, the application determines that packet P7 was delayed because packet P3 of the first segment was received while waiting for packet P7, and measures that the gap time or delay between packets P6 and P7 was G3. The application detects that packet P8 was also delayed because packet P4 was received while waiting for P8, and that the gap time or delay between packets P7 and P8 was G4.

Note that example gap G1 has a span size of 2 because gap G1 spans two intervening packets from the second segment. Each of example gaps G2, G3, and G4 has a span size of 1 because these gaps span only one intervening packet from the other flow. Further note that different gaps, such as G2, G3, and G4, may be different from each other, and a multiple packet gap, such as gap G1, may not be an exact multiple of a single packet gap.

A segment, such as the segment comprising packets P0-P4, has an adaptive timeout period associated therewith. For a segment, the adaptive timeout period can be computed in a variety of methods using the measured gaps in that segment or another similar segment. A second segment is similar to a first segment if the second segment and the first segment are—from the same flow, from the same sender, to the same receiver, traveling in the network over the same link, have the same chunk ID, have packet sequence numbers or identifiers from the same sequence, or some combination of two or more of these and other similarly purposed factors.

One example method for computing the adaptive timeout period for a segment applies a function to a combination of one or more of—a span size of a gap in the segment or a similar segment, an average gap time in the segment or a similar segment, a variance between the gaps in the segment or a similar segment, a tolerance factor, and other similarly purposed factors. For example, T=f (span size, average gap time, tolerance factor, variance) where T=adaptive timeout period, and F=a suitable function.

The average can be computed in any suitable manner without departing the scope of the illustrative embodiments. For example, in one embodiment, the average can be a statistical average of a set of gap times. In another example embodiment, the average can be an exponentially weighted moving average (EWMA) computed using a set of gap times.

The tolerance factor allows for increasing or decreasing the adaptive timeout period to account for observational errors, unusual conditions, spikes and other unusual observations, or some combination from these and other such factors. In one example embodiment, a user or a system sets the tolerance factor. In another example embodiment, even the tolerance factor is computed using a set of network conditions.

The specific manner of adapting the adaptive timeout period is not intended to be limiting on the illustrative embodiments. From this disclosure, those of ordinary skill in the art will be able to conceive many other methods for adapting the adaptive timeout period and the same are contemplated within the scope of the illustrative embodiments. For example, another method for adapting the adaptive timeout period can be based on an estimate of a throughput of a channel or link in the network. Another example method for adapting the adaptive timeout period can be based on a coarse-grained estimate instead of a per-packet estimate as described herein. Another example method for adapting the adaptive timeout period can be based on a per-path estimation for a path or a portion thereof used by a flow.

Figure 7:
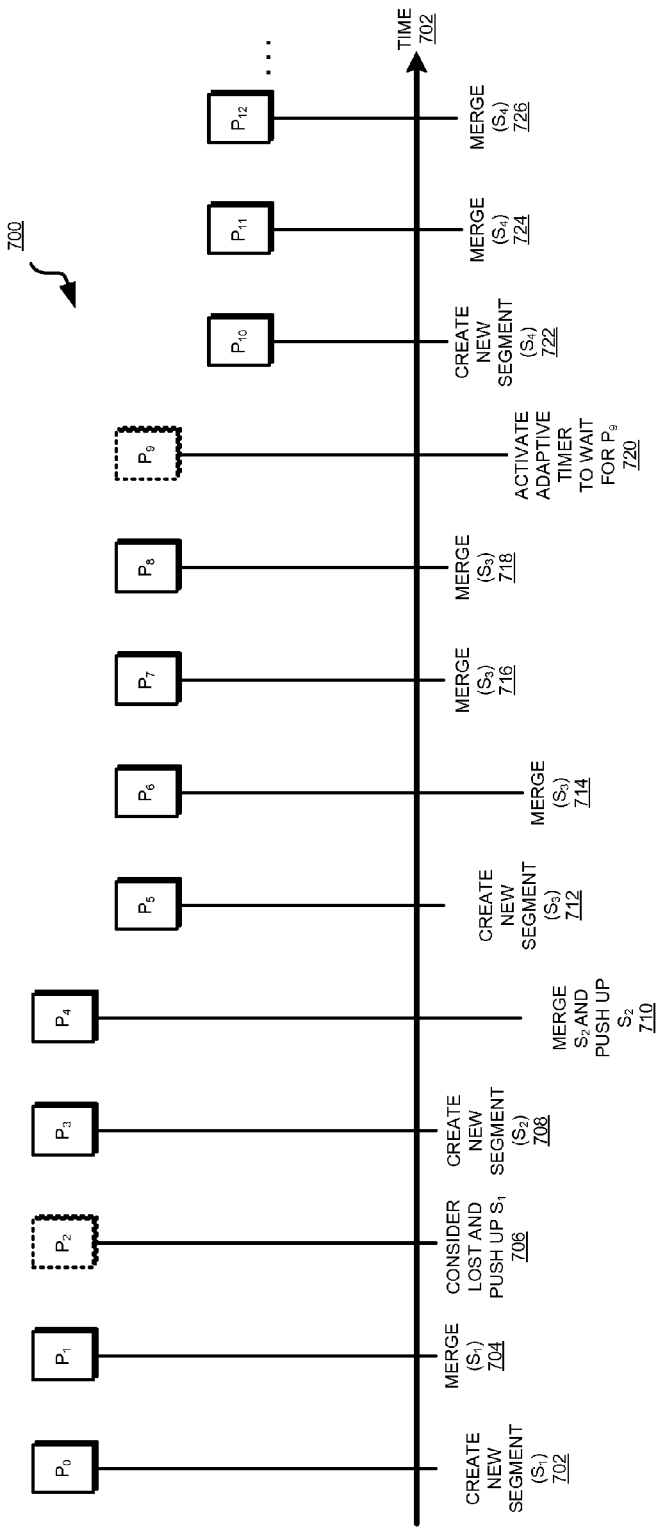
FIG. 7 depicts a timing diagram of a process for selectively using adaptive timeouts for handling packet reordering at a network adapter in accordance with an illustrative embodiment.

With reference to FIG. 7, this figure depicts a timing diagram of a process for selectively using adaptive timeouts for handling packet reordering at a network adapter in accordance with an illustrative embodiment. Process 700 can be implemented in application 502 in FIG. 5.

A method for using an adaptive timeout can be further enhanced by using additional information. For example, even though an embodiment described herein can use an adaptive timeout to wait for a missing packet, in some cases, such waiting may be avoidable.

For example, assume that the data packets carry a chunk ID of the chunk of the flow to which the data packets belong. An embodiment can use the additional chunk ID information from the packets to make smarter use of the adaptive timeouts. As another example, an embodiment can use the additional path information carried in the packets to make smarter use of the adaptive timeouts.

For example, packets of a chunk travel over a designated path. Therefore, packets of a chunk, e.g., packets P0-P4, are likely to remain in sequence in the queues on that path. Therefore, the chances of packet reordering, such as packet P3 arriving before packet P2, are negligible for the packets belonging to the same chunk. Such reordering occurs when the packets take different paths with different path delays, which is not the case with the packets of a chunk.

Therefore, if the modified receiver NIC receives the packets of a chunk such that there is a packet sequence number missing in the sequence, the missing packet corresponding to that missing sequence number can safely be assumed to have been lost. Consequently, the modified receiver NIC need not activate an adaptive timeout timer for that packet, stop building the segment, and push up the partial segment.

This situation is illustrated in FIG. 7 using packets P0-P4. The application receives packets for various segments along timeline 702, among which are packets P0-P4, which belong to a segment of a chunk. The application receives P0 and creates a new segment S1 (702). The application merges packet P0 in the newly created segment S1.

The application receives packet P1 timely and orderly after packet P0. The application merges packet P1 in segment S1 (704).

The application receives P3 thereafter. The application recognizes that the sequence number of P1 follows the sequence number of P0, but the sequence number of P3 does not follow the sequence number of P1.

With the sequence number information, the application can determine how many packets are missing. The application determines here that only a single packet, to wit, packet P2, is missing.

When the application has the information about the size of the segment, such as from a segment size threshold or otherwise, the application determines that missing packet P2 is not a boundary packet of the segment. In other words, the segment does not start or end with the missing packet. In yet other words, missing packet P2 lies somewhere in the middle of the segment.

According to the logic described earlier, the application can safely conclude that packet P2 is lost in the chunk transmission. The application concludes that packet P2 is lost, omits initiating an adaptive timeout timer for packet P2, stops building segment S1, and pushes segment S1 up (706).

The application creates new segment S2 and merges packet P3 into segment S2 (708). The application receives packet P4 timely and orderly after packet P3. The application merges packet P4 in segment S2 (710).

Based on the information available to the application about the chunk, the application determines that packet P4 was the end of the chunk. For example, given the chunk size and the packet size, the application can determine the number of packets to expect in a chunk. Accordingly, the application determines that packets P0-P4 would have been the five example packets transmitted in the chunk. Based on determining the end of the chunk, the application stops building segment S2, and pushes segment S2 up (710).

When a missing packet is at a chunk boundary, i.e., the missing packet is the first or the last packet of the chunk, the conclusion that the missing packet is probably lost is not as valid as for the packets missing from the middle of the chunk. For example, the packet can simply be delayed and still not cause any out of sequence packets.

Consider the chunk comprising packets P5-P9 in FIG. 7. The application detects the beginning of a chunk at packet P5, creates a new segment S3, and merges packet P5 with segment S3 (712). The application timely and orderly receives packet P6 after P5, and merges packet P6 with segment S3 (714). The application timely and orderly receives packet P7 after P6, and merges packet P7 with segment S3 (716). The application timely and orderly receives packet P8 after P7, and merges packet P8 with segment S3 (718).

The application does not receive packet P9 when expected but receives packet P10 from another chunk. The application cannot be sure whether P9 is lost or delayed. P9 could have been the last packet of the chunk in sequence after P8, but could be simply delayed. Receiving of P10 from another chunk is insufficient to conclude that P9 is lost because P10 could have taken a different path in the network, faced lower latency, and arrived quicker than P9 at the modified receiver NIC.

Therefore, for missing packet P9, which is a boundary packet of a chunk, the application initiates an adaptive timeout timer, and waits for packet P9 (720). If packet P9 arrives before the adaptive timeout timer expires (not shown), the application merges that packet with segment S3 (not shown), and pushes up segment S3 (not shown). If packet P9 does not arrive before the adaptive timeout timer expires (not shown), the application stops building segment S3 (not shown), and pushes up segment S3 (not shown).

The application begins new segment S4 with packet P10 (722). The application merges packet P11 with segment S4 when packet P11 timely and orderly arrives after P10 (724). The application merges packet P12 with segment S4 when packet P12 timely and orderly arrives after P11 (726).

The application continues processing the timely and orderly packets, the packets missing from a chunk boundary, and the packets missing from the middle portion of a chunk in this manner. Thus, the waiting durations in the modified receiver NIC are further reduced by judiciously applying the adaptive timeout timer by using the information about the chunk, the chunk identifiers, chunk size, or some combination thereof.

This method of selectively applying the adaptive timeout timer is not intended to be limited to only chunk information. From this disclosure, those of ordinary skill in the art will be able to adapt an embodiment such that the application can judiciously apply the adaptive timeout timer when another type of additional information, such as path identifier information, is available.

Figure 8:
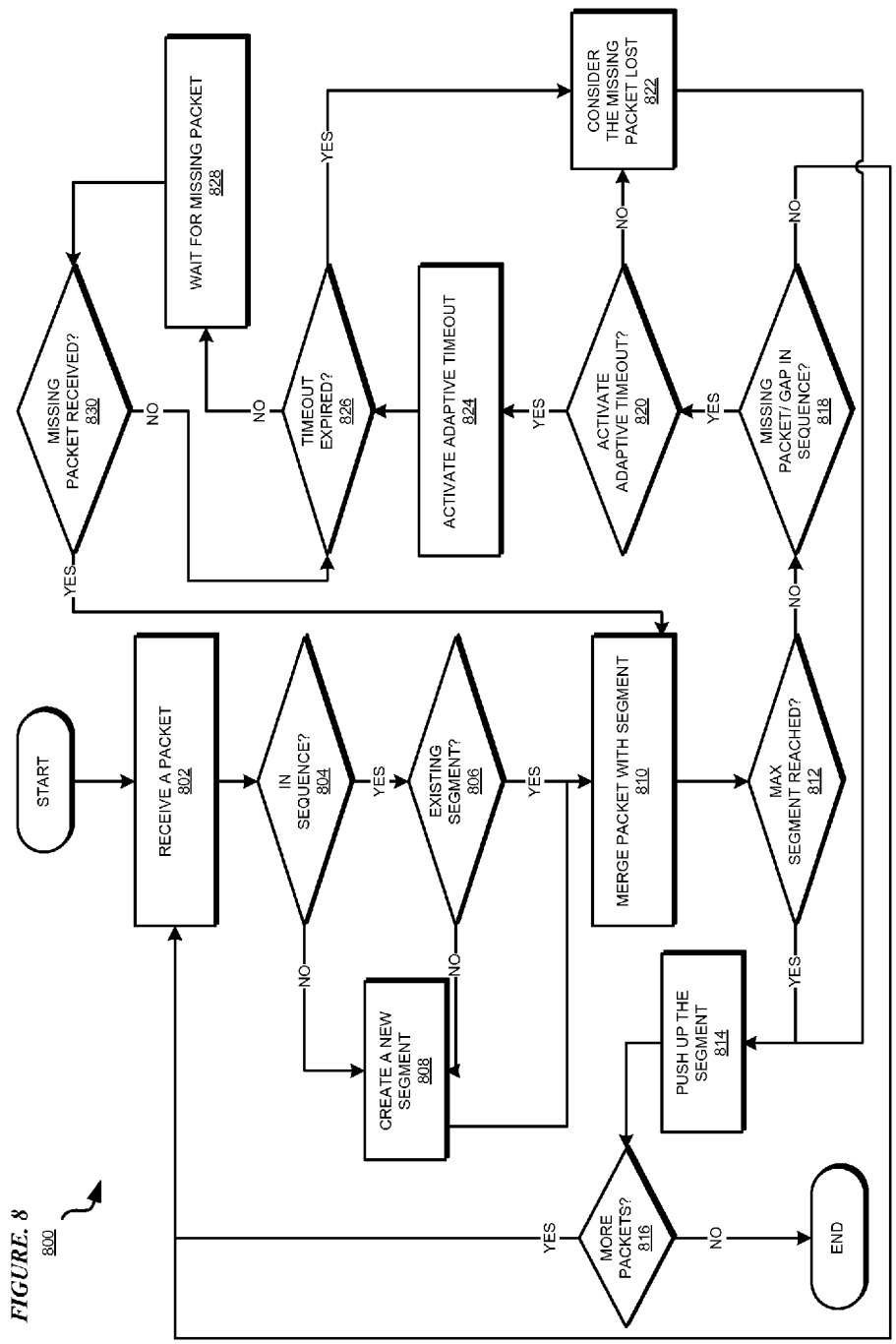
FIG. 8 depicts a flowchart of an example process for handling packet reordering at a network adapter in accordance with an illustrative embodiment.

With reference to FIG. 8, this figure depicts a flowchart of an example process for handling packet reordering at a network adapter in accordance with an illustrative embodiment. Process 800 can be implemented in application 502 in FIG. 5.

The application receives a packet (block 802). The application determines whether the packet is in-sequence (block 804). If the packet is in sequence ("Yes" path of block 804), the application determines whether a segment already exists for this packet (block 806). If the packet is not in sequence ("No" path of block 804), or if a segment does not already exist ("No" path of block 806), the application creates a new segment (block 808). The application merges the packet with the new segment (block 810). If a segment already exists ("Yes" path of block 806), the application merges the packet with the existing segment at block 810.

The application determines whether a maximum size of the segment, such as a segment size threshold, has been reached (block 812). If the maximum size of the segment has been reached ("Yes" path of block 812), the application pushes up the segment (block 814).

The application determines whether more packets are to be processed (block 816). If more packets are to be processed ("Yes" path of block 816), the application returns process 800 to block 802. If no more packets are to be processed ("No" path of block 816), the application ends process 800 thereafter.

If the maximum size of the segment has not been reached ("No" path of block 812), the application determines whether there is a missing packet before the packet, i.e., whether there is a gap in the sequence of packets (block 818). If there is no gap in the sequence of packets ("No" path of block 818), the application returns process 800 to block 802.

If there is a gap in the sequence of packets ("Yes" path of block 818), the application determines whether to active the adaptive timeout timer (block 822). If the adaptive timeout timer should not be activated ("Yes" path of block 822), the application considers the missing packet lost (block 822). The application proceeds to block 814 thereafter to push up the segment. The application creates a new segment (not shown) and merges (not shown) the received packet of block 802 into the new segment.

If the adaptive timeout timer should be activated ("Yes" path of block 822), the application activates the adaptive timeout timer (block 824). The application determines whether the adaptive timeout timer has expired (block 826). If the timer has expired ("Yes" path of block 826), the application proceeds to block 822, considers the missing packet lost, and proceeds from block 822 thereafter.

If the timer has not expired ("No" path of block 826), the application waits for the missing packet (block 828). The application determines whether the missing packet has been received (block 830). If the missing packet has not been received ("No" path of block 830), the application returns process 800 to block 826. If the missing packet has been received ("Yes" path of block 830), the application progresses process 800 to block 810 and proceeds therefrom.

Figure 9:
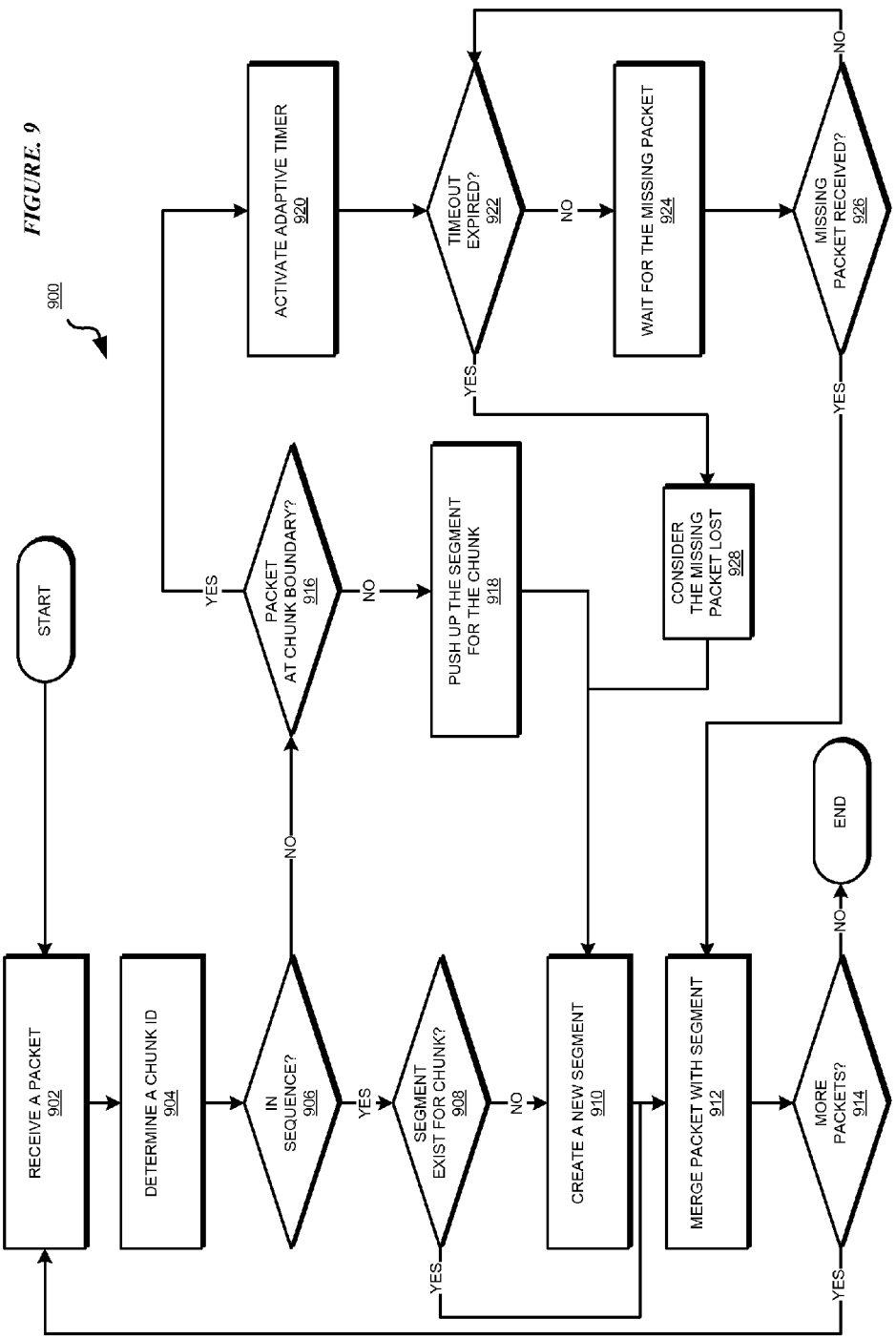
FIG. 9 depicts a flowchart of an example process for selectively applying the adaptive timeout timer for handling packet reordering at a network adapter in accordance with an illustrative embodiment.

With reference to FIG. 9, this figure depicts a flowchart of an example process for selectively applying the adaptive timeout timer for handling packet reordering at a network adapter in accordance with an illustrative embodiment. Process 900 can be implemented in application 502 in FIG. 5.

The application receives a packet (block 902). The application determines a chunk identifier associated with the packet (block 904). The application determines whether the packet is in-sequence (block 906). If the packet is in sequence ("Yes" path of block 906), the application determines whether a segment already exists for this packet (block 908). If a segment does not already exist ("No" path of block 908), the application creates a new segment (block 910). The application merges the packet with the new segment (block 912). If a segment already exists ("Yes" path of block 908), the application merges the packet with the existing segment at block 912.

The application determines whether more packets are to be processed (block 914). A determination based on the maximum size of the segment, as in blocks 812 and 814 in FIG. 8, can also be implemented (not shown) in process 900.

If more packets are to be processed ("Yes" path of block 914), the application returns process 900 to block 902. If no more packets are to be processed ("No" path of block 914), the application ends process 900 thereafter.

If the packet is not in sequence ("No" path of block 906), the application determines whether the packet is at a chunk boundary (block 916). If the packet is not at a chunk boundary ("No" path of block 916), the application pushes up the segment for the chunk (block 918). The application then creates a new segment at block 910 and merges the received packet of block 902 into the new segment at block 912 and proceeds therefrom.

If the packet is at a chunk boundary ("Yes" path of block 916), the application activates the adaptive timeout timer (block 920). The application determines whether the adaptive timeout timer has expired (block 922). If the timer has expired ("Yes" path of block 922), the application considers the missing packet lost (block 928), and proceeds from block 910 to create a new segment and merge the packet received at block 902 with the new segment at block 912. The application progresses process 900 from block 912 thereafter.

If the timer has not expired ("No" path of block 922), the application waits for the missing packet (block 924). The application determines whether the missing packet has been received (block 926). If the missing packet has not been received ("No" path of block 926), the application returns process 900 to block 922. If the missing packet has been received ("Yes" path of block 926), the application progresses process 900 to block 912 and proceeds therefrom.

Thus, a computer implemented method, system or apparatus, and computer program product are provided in the illustrative embodiments for handling packet reordering at a network adapter. Where an embodiment or a portion thereof is described with respect to a type of device, the computer implemented method, system or apparatus, the computer program product, or a portion thereof, are adapted or configured for use with a suitable and comparable manifestation of that type of device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for handling packet reordering at a network adapter, the method comprising:
receiving a set of packets at a network adapter, wherein a component of the network adapter is configured to aggregate a subset of in-sequence packets from the set of packets into at least one segment before passing the at least one segment from the network adapter to a next layer in a protocol stack;
storing an in-sequence packet from the set of packets into a first segment;
storing, responsive to receiving an out of sequence packet in the set of packets, the out of sequence packet in a second segment;
activating, responsive to receiving the out of sequence packet, an adaptive timeout timer;
holding the first segment at the network adapter while the adaptive timeout timer runs;
receiving, prior to the adaptive timeout timer expiring, a missing packet;
including the missing packet in the first segment; and
sending the first segment to the next layer.

2. The method of claim 1, further comprising:
determining whether to activate the adaptive timeout timer, wherein the activating is responsive to determining that the adaptive timeout timer should be activated.

3. The method of claim 2, further comprising:
determining whether the out of sequence packet is one of (i) a beginning packet, and (ii) an ending packet, of a data flow chunk identified by a chunk identifier, wherein the activating is further responsive to the out of sequence packet being one of the beginning packet and the ending packet of the data flow chunk.

4. The method of claim 3, wherein the chunk identifier is distinct from a data flow identifier associated with the data flow.

5. The method of claim 2, further comprising:
determining that a packet in the set of data packets is out of sequence;
determining that the packet is not one of a beginning packet and an ending packet of a data flow chunk identified by a chunk identifier;
omitting activating a second adaptive timeout timer for the packet; and
regarding the packet as lost.

6. The method of claim 1, further comprising:
configuring the adaptive timeout timer for measuring a period, wherein the gap time comprises an amount of time a reordered packet of a previous segment takes to arrive.

7. The method of claim 6, further comprising:
measuring a set of gap times, wherein the gap time is a member of the set of gap times; and
applying, as a part of determining the period, a function to the set of gap times.

8. The method of claim 7, further comprising:
determining a span of a second gap time in the set of gap times, wherein the span identifies a number of intervening packets received during the second gap time; and computing an average of the set of gap times, wherein the function uses the span and the average.

9. The method of claim 8, further comprising:
computing, as a part of computing the average, an Exponentially weighted Moving Average (EWMA) of the set of gap times.

10. The method of claim 6, wherein the common aspect comprises a data flow, where the segment and the second segment are each parts of the data flow.

11. The method of claim 10, wherein the common aspect comprises a data flow chunk identifier, and wherein the segment and the second segment are each parts of the data flow such that packets in the segment and packets in the second segment each carry the chunk identifier.

12. The method of claim 1, further comprising:
receiving the out of sequence packet at the network adapter, wherein the out of sequence packet comprises a packet sequence identifier; and
determining, by comparing the packet sequence identifier with another packet sequence identifier associated with an in-sequence packet received prior to the out of sequence packet, that a packet sequence identifier corresponding to the missing packet is missing, wherein the missing packet should have been received after the in-sequence packet and before the out of sequence packet.

13. The method of claim 1, wherein the component of the network adapter comprises a hardware component in the network adapter.

14. The method of claim 1, wherein the component of the network adapter comprises a device driver of the network adapter.

15. The method of claim 1, wherein the component of the network adapter comprises a firmware component in the network adapter.

16. The method of claim 1, wherein the component of the network adapter comprises a code called by a device driver of the network adapter.

17. The method of claim 1, further comprising:
after receiving a missing packet, merging the second segment into the first segment when the first and second segments are in sequence and the merging does not cause the first segment to exceed a segment size threshold.

18. A computer usable program product comprising a computer readable storage device including computer usable code for handling packet reordering at a network adapter, the computer usable program product comprising:
computer usable code for receiving a set of packets at a network adapter, wherein a component of the network adapter is configured to aggregate a subset of in-sequence packets from the set of packets into at least one segment before passing the at least one segment from the network adapter to a next layer in a protocol stack;
computer usable code for storing an in-sequence packet from the set of packets into a first segment;
computer usable code for storing, responsive to receiving an out of sequence packet in the set of packets, the out of sequence packet in a second segment;
computer usable code for activating, responsive to receiving the out of sequence packet, an adaptive timeout timer;
computer usable code for holding the first segment at the network adapter while the adaptive timeout timer runs;
computer usable code for receiving, prior to the adaptive timeout timer expiring, a missing packet;
computer usable code for including the missing packet in the first segment; and computer usable code for sending the first segment to the next layer.

19. The computer usable program product of claim 18, further comprising:
computer usable code for determining whether to activate the adaptive timeout timer, wherein the activating is responsive to determining that the adaptive timeout timer should be activated.

20. The computer usable program product of claim 19, further comprising:
computer usable code for determining whether the out of sequence packet is one of (i) a beginning packet, and (ii) an ending packet, of a data flow chunk identified by a chunk identifier, wherein the activating is further responsive to the out of sequence packet being one of the beginning packet and the ending packet of the data flow chunk.

21. The computer usable program product of claim 18, wherein the computer usable code is stored in a computer readable storage device in a data processing system, and wherein the computer usable code is transferred over a network from a remote data processing system.

22. The computer usable program product of claim 18, wherein the computer usable code is stored in a computer readable storage device in a server data processing system, and wherein the computer usable code is downloaded over a network to a remote data processing system for use in a computer readable storage device associated with the remote data processing system.

23. A data processing system for handling packet reordering at a network adapter, the data processing system comprising:
a storage device, wherein the storage device stores computer usable program code; and a processor, wherein the processor executes the computer usable program code, and wherein the computer usable program code comprises:
computer usable code for receiving a set of packets at a network adapter, wherein a component of the network adapter is configured to aggregate a subset of in-sequence packets from the set of packets into at least one segment before passing the at least one segment from the network adapter to a next layer in a protocol stack;
computer usable code for storing an in-sequence packet from the set of packets into a first segment;
computer usable code for storing, responsive to receiving an out of sequence packet in the set of packets, the out of sequence packet in a second segment;
computer usable code for activating, responsive to receiving the out of sequence packet, an adaptive timeout timer;
computer usable code for holding the first segment at the network adapter while the adaptive timeout timer runs;
computer usable code for receiving, prior to the adaptive timeout timer expiring, a missing packet;
computer usable code for including the missing packet in the first segment; and
computer usable code for sending the first segment to the next layer.

24. A network adapter for handling packet reordering at the network adapter, the network adapter comprising:
a component to receive a set of packets at a network adapter, wherein a component of the network adapter is configured to aggregate a subset of in-sequence packets from the set of packets into at least one segment before passing the at least one segment from the network adapter to a next layer in a protocol stack;
the component storing an in-sequence packet from the set of packets into a first segment;
the component storing, responsive to receiving an out of sequence packet in the set of packets, the out of sequence packet in a second segment;
an adaptive timeout timer that is activated responsive to receiving the out of sequence packet, wherein the first segment is held at the network adapter while the adaptive timeout timer runs;
a second component to receive, prior to the adaptive timeout timer expiring, a missing packet;
a third component to include the missing packet in the first segment; and
a fourth component to send the first segment to the next layer.

25. A system for handling packet reordering, comprising:
a network adapter receiving a set of packets at a network adapter, wherein a component of the network adapter is configured to aggregate a subset of in-sequence packets from the set of packets into at least one segment before passing the at least one segment from the network adapter to a next layer in a protocol stack;
the network adapter storing an in-sequence packet from the set of packets into a first segment;
the network adapter storing, responsive to receiving an out of sequence packet in the set of packets, the out of sequence packet in a second segment;
a device driver of the network adapter, wherein an adaptive timeout timer in the device driver is activated responsive to receiving the out of sequence packet, wherein the first segment is held at the network adapter while the adaptive timeout timer runs;
a networking component coupled with the network adapter to receive, prior to the adaptive timeout timer expiring, a missing packet;
the network adapter including the missing packet in the first segment; and
the network adapter sending the first segment to the next layer.

\* \* \* \* \*